United States Patent Office 2,705,223
Patented Mar. 29, 1955

2,705,223

THERMOSETTING RESINOUS COMPOSITIONS FROM EPOXY RESINS AND POLYAMIDES DERIVED FROM POLYMERIC FAT ACIDS

Malcolm M. Renfrew and Harold Wittcoff, Minneapolis, Minn., assignors to General Mills, Inc., a corporation of Delaware No Drawing. Application March 11, 1952,
Serial No. 276,054

12 Claims. (Cl. 260—18)

The present invention relates to the curing of mixtures of polyamide resins and complex epoxides. The polyamides employed comprise the thermoplastic condensation products of polymeric fat acids with aliphatic polyamines. These polyamides are relatively soft resinous materials of a somewhat waxy character which are still fusible and soluble in some solvents. The complex epoxides employed result from the reaction of polyhydric phenols with condensation agents containing epoxy groups or potential epoxy groups. The complex epoxides are resinous in nature and display solubility in usual ketone solvents.

It is desirable to convert the polyamides and the complex epoxides into the insoluble and infusible state for many ultimate uses. Thus these materials are adapted as coating materials and it is desirable to have the ultimate coating insoluble and infusible. These materials may likewise be used for molding and casting purposes and insolubility and infusibility in the final state are desirable.

Heretofore it has not been possible to convert the polyamide resins of the present type into hard insoluble and infusible resins. On the other hand, the complex epoxides have heretofore been cured to an insoluble infusible condition by means of a wide variety of materials, of which the amines are typical. The reaction of amines with complex epoxides causes the material to cure to an infusible insoluble state through the reaction of the amines with epoxy groups and to some extent through reaction between epoxy groups and hydroxy groups, catalyzed by the amines. In addition, acidic materials, such as phthalic anhydride, have been used to cure epoxy resins. Low molecular weight curing agents, such as diethylene triamine and phthalic anhydride, tend to produce extremely brittle cured materials. In addition, these materials are volatile. This volatility not only results in loss of material but also makes the control difficult, since control of the degree of cure is difficult where an uncontrollable quantity of the material may vaporize.

Certain of the aminoplast resins have also been suggested as curing agents for the epoxide resin. While these aminoplast resins are non-volatile, they are likewise disadvantageous in that they produce extremely brittle cured products.

It has now been discovered that small quantities of these epoxy resinous materials may be used to cure the polyamides above described, such that a rubbery highly resilient and extremely flexible composition results. Likewise small quantities of the polyamides may be used to cure the epoxy resins into hard insoluble and infusible, yet flexible and tough, resins. Between these extremes other cured resinous products may be obtained, the properties depending upon the relative proportions of the polyamides and the epoxy resins employed.

It is therefore an object of the present invention to provide a novel method of curing mixtures of epoxy resins and polyamide resins.

It is a further object of the present invention to provide novel compositions composed of epoxy resins and polyamide resins.

The present invention is applicable to epoxy resins in general. These epoxy resins are complex polymeric reaction products of polyhydric phenols with polyfunctional halohydrins such as epichlorhydrin and glycerol dichlorhydrin. Usually the difunctional chlorhydrin is used in proportions in excess of that equivalent to the polyhydric phenol and less than that which is twice the equivalent amount. The reaction is carried out in the presence of caustic alkali which is usually employed in at least the quantity necessary to combine with the halogen liberated from the halohydrin, and usually is employed in excess. The products obtained may contain terminal epoxy groups or terminal epoxy groups and terminal primary hydroxyl groups. In the complex reaction mixture the terminal epoxy groups are generally in excess of the terminal primary hydroxyl groups. Typical polyhydric phenols include resorcinol, and various bisphenols resulting from the condensation of phenol with aldehydes and ketones such as formaldehyde, acetaldehyde, acetone, methyl ethyl ketone, and the like. Resins of this type are disclosed in Greenlee Patent 2,585,115 and these resins are useful in the present invention.

The molecular weight of the epoxy resins may be controlled by the relative proportions of the reactants, as well as by the extent to which the reaction is carried on. The present invention involving the curing of these epoxy resins may be applied to all epoxy resins. The molecular weight of the resin is not critical since both very low molecular weight resins, as well as very high molecular weight resins, can be cured by this method. The properties of the cured resin compositions may, of course, vary with the molecular weight of the epoxy resin employed, as well as the nature and molecular weight of the polyamide employed.

The polyamide compositions which may be used for curing the epoxy resins are, in general, those derived from polymeric fat acids and aliphatic polyamines. Resins of this general type are disclosed in Cowan et al. Patent 2,450,940. Typical of these polyamides are those made with polymeric fat acids with ethylene diamine and/or diethylene triamine. It is possible to produce resins having terminal amine groups or terminal carboxyl groups, or in which some of the terminal groups are amine groups while others are carboxyl groups. Since both amine groups and carboxyl groups are useful in curing the epoxy resins, it will be apparent that a wide variety of these polyamides are useful for that purpose. Since the amine groups react more rapidly in curing the epoxy resins, it is preferred to employ polyamides containing excess amine groups. Where slower curing is desired polyamides having excess carboxyl groups and polyamides containing both amine groups and carboxyl groups may be used, especially if the carboxyl groups are in excess. The amount of free amine groups or free carboxyl groups measured as amine number and acid number respectively may be determined by titration. The amine number is defined as the number of milligrams of potassium hydroxide equivalent to the free amine groups present in one gram of the resin. The term acid number is defined as the number of milligrams of KOH equivalent to the free carboxyl groups present in one gram of the resin. In general, resins having amine or acid groups with a range of 5 to 100 are preferred for the present purposes.

The polymeric fat acids employed in preparing the polyamides are those resulting from the polymerization of drying or semi-drying oils, or the free acids or simple aliphatic alcohol esters of such acids. Suitable drying or semi-drying oils include soybean, linseed, tung, perilla, oiticica, cottonseed, corn, tall, sunflower, safflower, dehydrated castor oil, and the like. In the polymerization process for the preparation of the polymeric fat acids the fatty acids with sufficient double bond functionality combine for the most part, probably by a Diels Alder mechanism, to provide a mixture of dibasic and higher polymeric acids. The acids with insufficient functionality to react remain as monomers and may be wholly or partially removed, for example by distillation. The residue after distillation consists of the desired polymeric acids and this mixture is used for the preparation of the polyamide resin. In place of this method of polymerization, any other method of polymerization may be employed whether the resultant polymer possesses residual unsaturation or not. The term "polymeric fat acids" as used herein, is intended to include the polymerized mixture of acids obtained, which mixture usually contains a predominant portion of dimeric acids, a smaller quantity of trimeric and higher polymeric acids, and some residual monomer.

These polymeric fat acids may be reacted with a variety of aliphatic polyamines for the production of the polyamide. The amidification reaction may be carried out under the usual conditions employed for this purpose, as will be evident from the examples. Polyamides of this type generally have molecular weights varying from 1,000 to 10,000 and are resistant to the corrosive action of water, alkali, acids, oils, greases, and organic solvents. The melting points vary, depending upon the reactants and the reaction conditions. Where aliphatic diamines, such as ethylene diamine, are employed for the preparation of the polyamide the resin may melt within the approximate range of 100–120° C. and usually within the range of 100–105° C.

Higher melting polyamide resins, for example melting within the range of 130–215° C., may be made by employing a mixture of polymeric fat acids and other polybasic acids, the latter having at least two carboxyl groups which are separated by at least 3 and not more than 8 carbon atoms. Typical of these polybasic acids are the aliphatic acids, glutaric, adipic, pimelic, suberic, azelaic, and sebacic, and the aromatic acids, terephthalic, and isophthalic acids. The melting point of the copolymer resin may vary within the range previously indicated, depending upon the particular reactants, relative ratios thereof, as well as the reaction conditions.

Low melting polyamide resins melting within the approximate range of 25–90° C. may be prepared from polymeric fat acids and aliphatic polyamines having at least 3 atoms intervening between the amine groups principally involved in the amidification reaction. These three atoms may be carbon atoms or hetero atoms. Typical of the polyamines which may be used are diethylene triamine, triethylene tetramine, tetraethylene pentamine, 1,4-diaminobutane, 1,3-diaminobutane, hexamethylene diamine, 3-(N-isopropylamino)propylamine, 3,3'-imino-bispropylamine, and the like. It will be observed that in the case of the first three named polyamines there are amine groups which are separated by only two carbon atoms. However, the amidification reaction involves the primary amine groups principally and the end product is suitable for purposes of the present invention. It is also apparent that some of the polyamines contain only a single primary amine group and in addition a secondary amine group. Under these circumstances the secondary amine group also becomes involved in the amidification reaction to a large extent, whereas in the case of diethylene triamine, for example two primary amine groups are amidified principally. A preferred group of these low melting polyamides are derived from polymeric fat acids and diethylene triamine and melt at from 40–70° C.

The curing of the epoxy resins is effected very simply. The resins may be mixed and melted and the curing takes place at temperatures of 80–200° C. With many of these resins, the resins are barely melted at as low temperatures as 80° C. Notwithstanding this fact, curing may start at this temperature in as short a period of time as one minute. When carboxyl groups are used to cure the epoxy resin, curing times in general are somewhat longer and frequently curing does not start until after 30 minutes at 100° C. The mixture of resins may likewise be used in solution for the preparation of coatings. The polyamides are soluble in aromatic hydrocarbons such as toluene, admixed with aliphatic alcohols, such as isopropanol, n-butanol, and the like. The epoxy resins are soluble principally in ketone solvents and the two resins may be separately dissolved and the solutions mixed to obtain a composition which may be cured. The mixed solutions are frequently stable for periods of several days and may be kept in that condition and applied prior to the time at which curing occurs. Curing in solution will occur in from 3 to 6 days at room temperature, and accordingly the solutions should be used prior to that time. For molding or casting purposes the two components may be ground or melted together and then poured into the mold that it is desired to fill.

There is a wide variation in the relative proportions of the polyamide resin and the epoxy resin which may be employed. The polyamide resin may be considered as the curing agent for the epoxy resin when the polyamide is employed as the minor constituent. At the same time the polyamide may be employed as the major constituent with a minor amount of epoxy resin in which it may be considered that the epoxy resin serves to cure the polyamide. Thus compositions varying from 10% epoxy resin and 90% of polyamide resin to 90% epoxy resin and 10% polyamide resin have been prepared and have desirable, though varying, properties. For example, when 10% of an epoxy resin is used with 90% of a polyamide resin derived from equimolar portions of diethylene triamine and polymeric fat acids, a cured material which is almost rubber-like in properties, is obtained. On the other hand, when 10% of the polyamide is used with 90% of the epoxy resin, a hard, highly resilient composition results. Between these extremes all other proportions are possible and the properties vary with the particular composition. The solvent resistance and mechanical resistance of all the compositions are excellent. Since the epoxy resin may vary in the content of epoxy groups and since the polyamides may vary in proportion of excess amine and carboxyl groups, it is apparent that the properties which are obtained depend upon the relative proportions of the various functional groups present. In general, the free amine or carboxyl groups should be present in an amount equivalent to at least one-quarter of the epoxy groups. Similarly, the epoxy groups should be present in a quantity which is equivalent to at least one-quarter of either the free amine or carboxyl groups.

The polyamide resin-epoxy resin blends, after having been subjected to the curing process, demonstrate a remarkable chemical resistivity. As such, they are useful as potting, molding, casting and laminating resins. The high degree of resiliency and resistance to shock which they demonstrate make them particularly valuable in such applications. Molded objects from the infusible products have extremely hard, glossy surfaces, but despite the extreme degree of hardness, the molded structures are tough and flexible. As will be indicated later, an amazing degree of flexibility is demonstrated, making these compositions valuable as surface coatings. Furthermore, this flexibility is demonstrated both in molded objects and in thin films, at low temperatures.

Lamination (including low pressure molding) and impregnation of materials such as wood, glass, glass fabric, plastic film, synthetic fibers, paper board, etc., are extremely important fields of application for the new compositions. Particularly is this so, since rapid curing can be effected and since the polar nature of the polyamide resins enhances the polarity of the final composition to a hitherto unobtainable degree. This high degree of polarity makes possible a very strong degree of adhesion to all types of surfaces. As a matter of fact, two metal surfaces of either the same or dissimilar metal may be bonded with the new compositions and the bonds demonstrate a surprising degree of strength.

The excellent flexibility referred to above makes it possible to use the new compositions as varnishes and protective coatings. As such they are ordinarily applied from solvent, and solvent solutions are best prepared by dissolving each constituent separately. Thus, the polyamide resins are dissolved in alcohol-hydrocarbon mixtures, whereas the epoxy resins are dissolved in ketone-hydrocarbon mixtures. The two solutions are then mixed and the mixtures may be used either as clear varnishes or they may be pigmented.

Thin films from these varnishes cure very rapidly and as a matter of fact, curing has been observed with some blends at room temperature. Such films, because of the high degree of adhesion demonstrated by the blends, coupled with their flexibility, are valuable as wire coatings and wire insulation. The good electrical properties of these compositions, particularly of those which contain polyamide resin with excess carboxyl groups, makes them particularly valuable in electrical applications. However, they are also extremely useful wherever corrosion-resistant metal coatings are required. Of particular importance is the field of can linings, where flexibility and resistance to the packaged product are prime requirements.

Paper coatings from these compositions are also of great importance. The films of epoxy resin-polyamide resin blends impart a high degree of gloss to the paper, in addition to providing barrier properties which make the paper practically impervious to moisture, moisture vapor, grease, solvents, chemicals, acids, alkalis, abrasion, scratching and the like. The varnishes also may be used as textile finishes because of their marked degree of adhesion to both synthetic and natural textile fibers.

Because of the resistance of these films to alkali they may be used as protective and waterproofing agents over cement and plastered surfaces.

*Example 1*

A polyamide was prepared from dimerized soybean oil fatty acids, containing small amounts of monomer and trimer, and aqueous ethylene diamine. The dimerized fatty acids and the soybean oil acids were placed in a vessel. While the vessel was being flushed with nitrogen and the mixture stirred, heat was applied until the temperature reached 130° C. At this temperature ethylene diamine was added gradually. The temperature was raised in 90 minutes to 200° C., where it was maintained for 3 hours. During the last hour a vacuum of 25 inches was applied. The product was allowed to cool slightly and was then poured out over Dry Ice to solidify.

The polyamide had the following properties:

| | |
|---|---|
| Acid number | 5.6 |
| Amine number | 11.3 |
| Color | 11 |
| Viscosity at 25° C. (Gardner-Holdt, 35% solution in butanol-toluene 1:1) | B-C |
| Gel time at 200° C. seconds | 750 |
| Ball and ring melting point °C | 105 |

Ninety parts of the above polyamide resin and 10 parts of a bis-phenol A-epichlorhydrin resin (Epon 1001) were melted together under a nitrogen atmosphere. After continued heating on a hot plate, the mixture gelled. An additional sample of the melt was placed as a thin film on a glass plate and allowed to stand at room temperature for 7 days. Gelation occurred and there resulted a flexible film which was very adherent to the glass plate.

*Example 2*

A mixture of the resins of Example 1 was prepared with the exception that 50 parts of each resin were employed. A gel formed on heating, which was of a rubbery characteristic at the elevated temperature. The cooled gel was somewhat more brittle and had less adherence to the glass than did the product of Example 1.

*Example 3*

A mixture of the resins of Example 1 was prepared composed of 10 parts of the polyamide resin and 90 parts of the epoxy resin. A softer gel was formed at elevated temperatures and the gel tended to be somewhat more brittle and friable than the gel of Example 1. The product did adhere to glass, however, better than did the product of Example 2.

*Example 4*

Ninety parts of polyamide resin of Example 1 and 10 parts of an epoxy resin, Epon RN34, were melted together under nitrogen as described in Example 1. Gelation of the mixture occurred readily at the elevated temperature.

Additional mixtures composed of 50 parts of each of the above resins were prepared and heated as described above. The gel which resulted was somewhat softer.

Ten parts of polyamide resin No. 94 and 90 parts of Epon resin RN34 were mixed and melted. The gel which formed was a soft gel.

*Example 5*

Forty pounds of dimeric fatty acids, 3.2 pounds of monomeric soybean oil acids, 7.9 pounds of 97% diethylene triamine, and 0.9 pound of phenol-formaldehyde resin (BR4036) were placed in a reaction vessel. The temperature was brought to 200° C. over a period of 1½ hours. The temperature was maintained at this point for 3¾ hours, the last 1¼ hours of the heating period being under vacuum of 22-27 inches of mercury. The vacuum was broken with nitrogen and the product allowed to cool. The product had the following properties:

| | |
|---|---|
| Ball and ring melting point | 51.9-52° C. |
| Gel time | 3 min. 30 sec. |
| Viscosity (Gardner-Holdt, 35% solution in toluene-butanol, 1:1). | B-C. |
| Color (Gardner, same solution as for 8. viscosity). | |
| Acid number | 6.8. |
| Amine number | 82.5. |

One hundred parts of this resin and 10 parts of an epoxy resin known as Epon resin 1004 were mixed in a beaker and melted slowly on a hot plate. When the temperature reached 120° C. gelation began to occur. As the temperature was raised up to 200° C., an infusible mass was formed.

*Example 6*

One hundred parts of an epoxy resin known as Epon resin 1004 and 10 parts of the polyamide resin described in Example 5 were weighed into a beaker and melted slowly on a hot plate. Gelation began at 120° C. and complete infusibility resulted at about 140° C.

*Example 7*

Several mixtures of Epon resin 1004 and the polyamide resin described in Example 5 were prepared as described in the following table. These mixtures were placed in beakers and heated to 100° C. Gelation to provide an infusible mass occurred practically immediately under these conditions.

| Parts Epon Resin 1004 | Parts Polyamide Resin | Temperature, °C. | Time Required for Gelation to start |
|---|---|---|---|
| 90 | 10 | 100 | 1-2 Min. |
| 80 | 20 | 100 | immediate. |
| 50 | 50 | 100 | 2-3 Min. |

The gelation also occurred in about the same time at 120° C.

*Example 8*

A number of mixtures of polyamide resin of Example 5 and Epon 1001 were prepared in the proportions indicated in the following table. The mixtures were then heated to 100° C. for gelation. The table indicates the time required for the onset of gelation.

| Ratio Epon to Polyamide | Time Required |
|---|---|
| 90:10 | 2 min. |
| 80:20 | 1 to 2 min. |
| 70:30 | Do. |
| 60:40 | Do. |
| 50:50 | Do. |
| 30:70 | Do. |
| 20:80 | Do. |
| 10:90 | 1 to 3 min. |
| | Do. |

With increasing quantities of the polyamide resin the gel becomes tougher, more rubbery and less brittle.

Eighty grams of Epon 1001 were melted and cooled to 80° C. At this temperature 20 grams of the polyamide of Example 5 were added and gelation started at 80° C. in 3 to 4 minutes. This demonstrates that gelation may be caused to occur at very near the minimum melting points of the materials.

*Example 9*

A polyamide was prepared from 41 pounds of dimeric fat acids and 2.54 pounds of 95.6% diethylene triamine. The dimer acids were employed in the ratio of 2 equivalents per equivalent of the diethylene triamine. The dimer acids and the diethylene triamine were mixed together in a kettle and heated. Approximately 2 hours is required to raise the temperature to 400° F., and the temperature was maintained at 400° F. for 3 hours, the last hour of which vacuum was applied to the kettle. The vacuum was broken by the introduction of carbon dioxide and the product was poured over solid carbon dioxide to prevent oxidation. The product had the following properties:

| | |
|---|---|
| Viscosity (Gardner-Holdt 35% solution in butanol-toluene 1:1) | A2 |
| Gel time min | 35 |
| Ball and ring melting point °C | 33 |
| Acid number | 91 |
| Amine number | 3.3 |
| Color | 10–11 |

This resin was used for the gelation of Epon resin 1001. 80 parts of Epon 1001 and 20 parts of the above polyamide were mixed and heated to 120–140° C. Gelation started in 25 to 30 minutes. For comparative purposes a similar gel was prepared from 80 parts of Epon 1001 and 20 parts of phthalic anhydride. The mixture started to gel at the same temperature in a period of 30–35 minutes. The polyamide resin-containing gel product had more strength and was less brittle than the phthalic anhydride containing gel product.

*Example 10*

Separate solutions were made of Epon 1001 and polyamide 100S. These solutions were made in mixture of toluene and methyl isobutyl ketone (1:1 by weight). Both the solutions were made with 35% solids. These separate solutions were prepared by warming the solvent and dissolving the resin in the warm solvent. Thereafter the solutions were allowed to cool. The solutions were mixed in various proportions as indicated in the following table, and the effect on gelation is likewise indicated in the following table:

| Ratio of Epon 1001 to Polyamide 100S | Gelation Tendency of Solution |
|---|---|
| 20:80 | gelled after 3 days. |
| 30:70 | Do. |
| 50:50 | gelled after 6 days. |
| 80:20 | stable indefinitely. |

The above solutions before gelation are coated on paper and the solvent allowed to evaporate. Thereafter the films are subjected to temperatures of 100–120° C. to cure rapidly. The papers had excellent moisture vapor and greaseproofness. They demonstrate marked resistance to abrasion as well as resistance to numerous solvents.

*Example 11*

Mixtures of the polyamide of Example 9 and Epon resin 1001 were prepared. These mixtures were heated to 180–200° C. and gels were formed. The results are indicated in the following table:

| Parts Epon | Parts Polyamide | Time for onset of gelation, min. | Gel Characteristics |
|---|---|---|---|
| 20 | 80 | 35–40 | soft. |
| 80 | 20 | 20 | hard. |

*Example 12*

A 50% solids solution of polyamide of Example 5 was prepared in a 1:1 mixture of toluene and isopropanol. A separate 50% solids solution was prepared of Epon 1001 in a 1:1 mixture of methyl isobutyl ketone and toluene. These two solutions were mixed to prepare a solution containing 80 parts of the polyamide resin to 20 parts of the Epon resin. This solution was coated on two tin strips and the solution allowed to dry. The two tin strips were placed with the coatings juxtaposed and heat was applied. The films gelled to yield a good strong bond between the tin plates, which was extremely resistant to warm vapors of solvents such as alcohols, hydrocarbons, ketones and esters.

We claim as our invention:

1. Composition of matter comprising an epoxy resinous material containing terminal epoxy groups and a polymeric polyamide curing agent, said polyamide being the reaction product of polymeric fat acids containing at least 2 carboxyl groups, and an aliphatic polyamine said polyamide containing free groups selected from the group consisting of amine groups and carboxyl groups.
2. Composition according to claim 1 in which the polyamide has an acid number between 5 and 100.
3. Composition according to claim 1 in which the polyamide has an amine number between 5 and 100.
4. Compositions according to claim 1 in which the polyamide is derived from polymeric fat acids and ethylene diamine.
5. Compositions according to claim 1 in which the polyamide is derived from polymeric fat acids containing at least 2 carboxyl groups, and diethylene triamine.
6. Process of curing epoxy resinous compositions containing terminal epoxy groups, which comprises reacting an epoxy resinous composition with a polymeric polyamide curing agent, said polyamide being the reaction product of polymeric fat acids containing as least 2 carboxyl groups, and an aliphatic polyamine said polyamide containing free groups selected from the group consisting of amine groups and carboxyl groups.
7. Process of curing epoxy resinous compositions containing terminal epoxy groups, which comprises reacting an epoxy resinous composition with a polymeric polyamide curing agent, said polyamide being derived from polymeric fat acids containing at least 2 carboxyl groups, and ethylene diamine said polyamide containing free groups selected from the group consisting of amine groups and carboxyl groups.
8. Process of curing epoxy resinous compositions containing terminal epoxy groups, which comprises reacting an epoxy resinous composition with a polymeric polyamide curing agent, said polyamide being derived from polymeric fat acids containing at least 2 carboxyl groups, and diethylene triamine said polyamide containing free groups selected from the group consisting of amine groups and carboxyl groups.
9. Composition of matter comprising an epoxy resinous composition containing terminal epoxy groups and a polymeric polyamide derived from polymeric fat acids containing at least 2 carboxyl groups, and an aliphatic polyamine, said polyamide having free amine groups equivalent to at least one-fourth of the epoxy groups in the epoxy resinous composition.
10. Composition according to claim 9 in which the polyamide is diethylene triamine.
11. Composition of matter comprising an epoxy resinous composition containing terminal epoxy groups and a polymeric polyamide derived from polymeric fat acids containing at least 2 carboxyl groups, and an aliphatic polyamine, said polyamide having free amine groups, the epoxy groups in the epoxy resinous composition being equivalent to at least one-fourth of said free amine groups.
12. Composition according to claim 11 in which the polyamine is diethylene triamine.

References Cited in the file of this patent

UNITED STATES PATENTS

| | | |
|---|---|---|
| 2,450,940 | Cowan et al. | Oct. 28, 1948 |
| 2,589,245 | Greenlee | Mar. 18, 1952 |
| 2,626,223 | Sattler | Jan. 20, 1953 |